J. D. TEW.
PNEUMATIC TIRE.
APPLICATION FILED JUNE 23, 1913.

1,202,919.

Patented Oct. 31, 1916.

Witnesses:
Cora Williams
N. C. Parton

Inventor:
J. D. Tew,
By Robert M. Pierson,
Attorney

UNITED STATES PATENT OFFICE.

JAMES D. TEW, OF AKRON, OHIO, ASSIGNOR TO THE B. F. GOODRICH COMPANY, OF NEW YORK, N. Y., A CORPORATION OF NEW YORK.

PNEUMATIC TIRE.

1,202,919.   Specification of Letters Patent.   Patented Oct. 31, 1916.

Application filed June 23, 1913.   Serial No. 775,267.

*To all whom it may concern:*

Be it known that I, JAMES D. TEW, a citizen of the United States, residing at Akron, in the county of Summit and State of Ohio, have invented certain new and useful Improvements in Pneumatic Tires, of which the following is a specification.

This invention relates to pneumatic tire casings in which the primary strain-resisting members of the carcass consist of transverse cords as distinguished from canvas or woven fabric. An example of such a tire is shown in the Gray and Sloper Patent No. 748,858 of January 5, 1904, representing a form of the well-known Palmer cord tire.

As usually constructed, these tires have the ends of the cords (of which there are two layers running diagonally across the tire from edge to edge, the cords of one layer crossing those of the other approximately at right-angles) looped around metal pins or staples, the prongs of which project into a groove or crevice in the bead and thereby anchor the cords mechanically to the bead. In practical experience with such tires, I have found that there is a tendency to chafing or wearing away of the outer layers of cords adjacent to the flange of the wheel rim, due to the pivoting or working of the cords against the rim at and from their points of anchorage, this pivoting being produced by the deforming strains to which the inflated tire is subjected in normal use.

In the ordinary tire having a carcass made of layers of canvas, it is a comparatively simple matter to prevent this form of chafing (which is distinguishable from "rim-cutting" due to lack of inflation or insufficient inflation) by stiffening the side layers of fabric with rubber having a high percentage of sulfur, but I find that method unsatisfactory in a cord tire.

The present invention has for its object to remedy the rim-chafing heretofore experienced in a normally-inflated tire of the cord type, and I accomplish this object by the means which I shall now proceed to describe and claim.

This application is in part a continuation of my application Serial No. 646,209, filed August 26, 1911.

Figure 1:
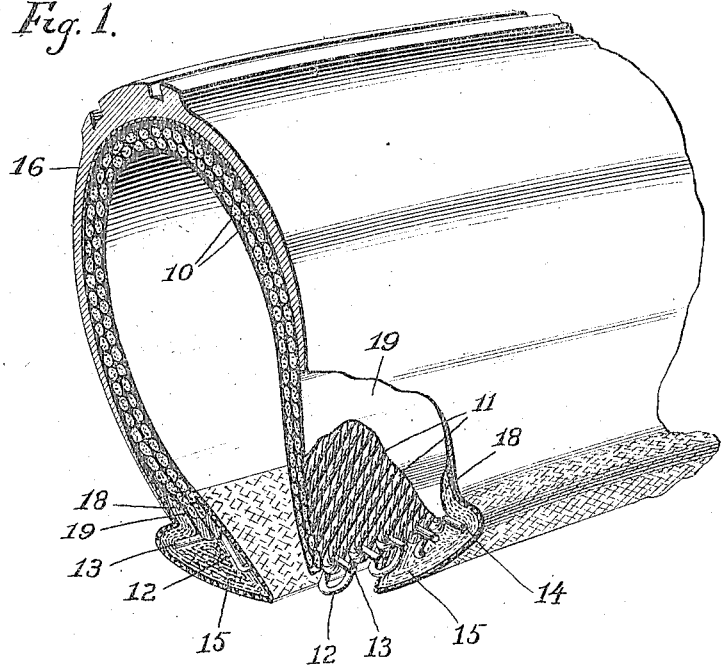
Figure 2:
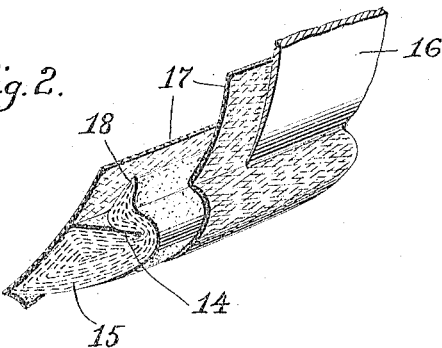

Figure 1 of the accompanying drawings represents a sectional perspective view of a cord-tire casing of the clencher type constructed according to my invention, and Fig. 2 represents a similar view of one edge of the casing, partially dissected.

It will be understood that the invention is not wholly limited to clencher tires, although the difficulty mentioned manifests itself principally in that type.

In the drawings, 10, 11 are the cords forming the inner and outer layers of the carcass, and 12 are the double pins or staples whose prongs 13 form anchorages for the looped ends of the cords and project into the grooves or crevices 14 in the two beads (or more properly, bead-cores) 15, thus being interlocked with the beads and forming a mechanical fastening between the latter and the cords.

16 is the rubber layer covering the tread and sides of the carcass.

The beads are usually molded out of rubberized fabric, and when in place are bound with one or more layers of rubberized fabric 17. The cords themselves are also preferably impregnated with rubber, and when the casing is vulcanized the whole becomes welded into an integral, flexible-sided, stiff-beaded structure in the well-known manner.

In carrying out my invention, I provide each of the beads 15 with an upward extension or flange 18, lying against the outer side of the outer layer of cords 11 and united thereto by the welding action of the rubber, of which a thin layer is shown at 19, inserted or caused to flow between the cords and the bead flange. In the usual construction, without this flange, the cords work back and forth, or circumferentially, to a limited extent, against the flange of the wheel-rim, and soon become chafed and worn away. The bead-flange interposes a shield between the rim-flange and the cords, and also, by reason of the welding or cementing together of the rubberized cords and bead-flange, which takes place by vulcanization, the working or pivoting of the cords at and from their extremities is to a certain extent overcome and transferred to a line outside the rim-flange, namely at or about the edge of the bead-flange 18. I find that this simple expedient greatly increases the durability of the tires.

It will be understood that I do not confine myself to the exact details of bead shape, form of anchorage, etc., here shown.

I claim:

1. A rubber tire casing comprising a carcass in which the primary strain-resisting structure consists of transverse cords having a limited pivotal movement circumferentially of the tire, caused by the deformation to which the latter is subjected in running, and bead-cores secured to the ends of the cords and formed with flanges of a substantial thickness extending radially outward on the outer sides of the outermost layer of cords to a line beyond the line of contact with the flange of the wheel rim, and united to the cords by rubber, whereby a shield is interposed between the rim flange and said layer of cords and the working of the innermost portions of the cords is reduced.

2. A rubber tire casing comprising a carcass having an outer layer of transverse cords, pins around which the inner ends of said cords are looped, and separately-formed clencher bead-cores interlocked with said pins and provided with outwardly-extending flanges of a substantial thickness united to the cords on the outer sides of the latter.

In testimony whereof I have hereunto set my hand, in the presence of two subscribing witnesses, this twentieth day of June, 1913.

JAMES D. TEW.

Witnesses:
L. A. SMITH,
S. O. MILLER.

Copies of this patent may be obtained for five cents each, by addressing the "Commissioner of Patents, Washington, D. C."